Aug. 14, 1923.
A. S. HRUSKA
1,465,042
CARBON HOLDER FOR PICTURE PROJECTORS
Filed April 16, 1921
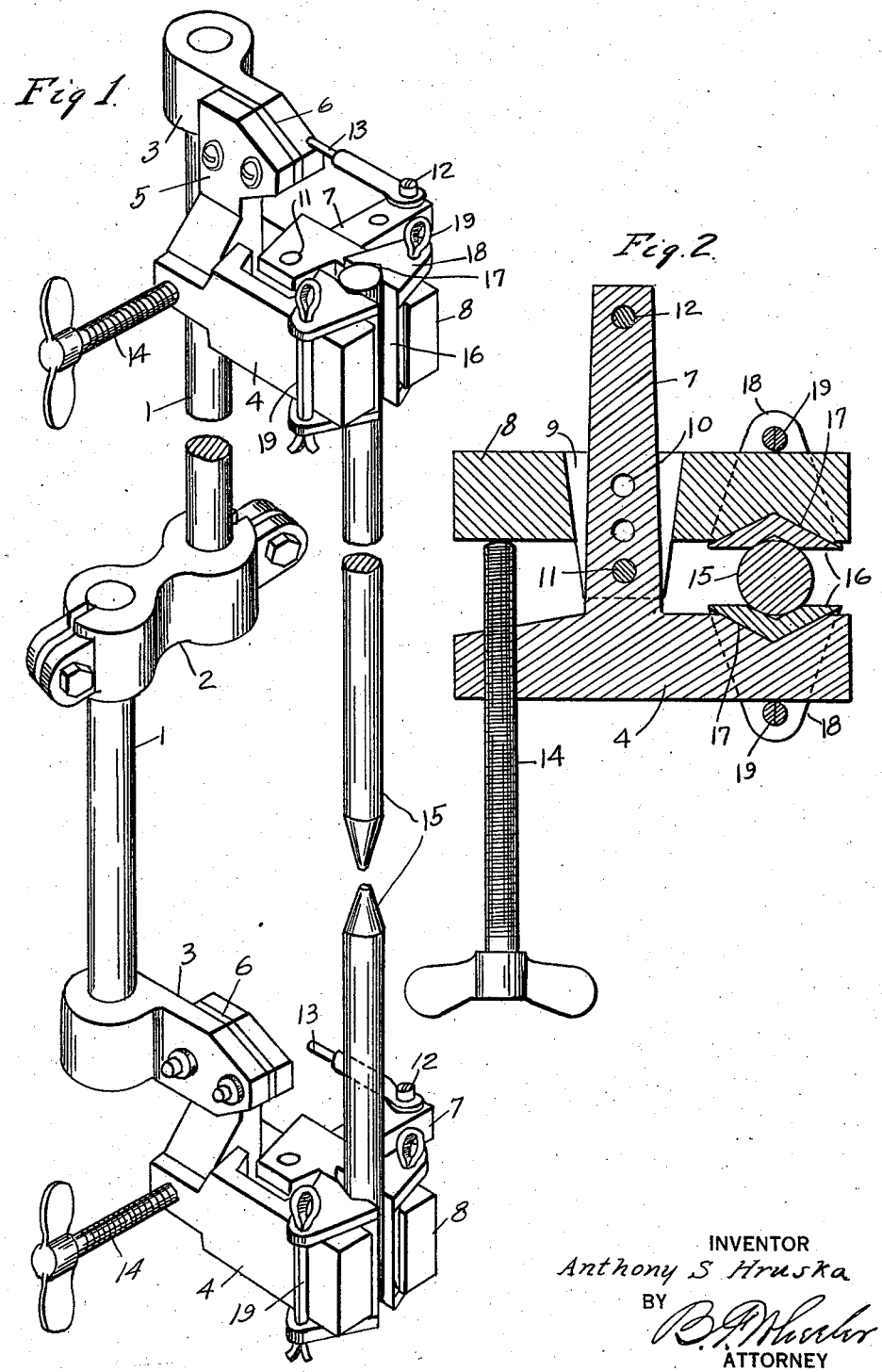
INVENTOR
Anthony S Hruska
BY
ATTORNEY Patented Aug. 14, 1923.

1,465,042

UNITED STATES PATENT OFFICE.

ANTHONY S. HRUSKA, OF DETROIT, MICHIGAN.

CARBON HOLDER FOR PICTURE PROJECTORS.

Application filed April 16, 1921. Serial No. 462,050.

*To all whom it may concern:*

Be it known that I, ANTHONY S. HRUSKA, a citizen of the country of Czechoslovakia, residing at Detroit, in the county of Wayne and State of Michigan, have invented a new and useful Carbon Holder for Picture Projectors, of which the following is a specification.

This invention relates to carbon holders for picture projectors.

It is an object of the invention to provide detachable bearing members for the carbon clamping jaws of a picture projecting machine so that when the carbons are allowed to burn closely to the jaws any damage resulting will be borne by the bearing members rather than the jaws proper, and the damage may be remedied by replacing only the bearing members instead of the entire jaws.

A further object is to provide an adjustable pivotal connection between the clamping jaws so as to readily adapt them to be engaged with carbons of various sizes.

A preferred embodiment of the invention is hereinafter described, and illustrated in the accompanying drawing, wherein, Fig. 1 is a perspective view of the carbon holder showing a pair of carbons mounted therein.

Fig. 2 is an enlarged horizontal sectional view through one of the pairs of clamping jaws.

In these views the reference character 1 designates a pair of parallel rods oppositely projecting from a yoke 2 consisting of two integral clamping collars in which said rods are relatively adjustable longitudinally. Upon the opposite ends of said rods there are mounted fast arms 3, each of which supports a carbon-clamping jaw 4. Said jaws are formed with upstanding securing lugs 5 which are bolted to the arms 3 but are insulated therefrom as indicated at 6. Each jaw 4 is formed with an integral laterally projecting arm 7, and co-acting jaws 8 are pivoted upon said arms. Preferably the jaws 7 are formed with openings 9 through which the arms 7 project, and said arms are each formed with a plurality of openings 10 for engagement by a pivot pin 11. A binding screw 12 engages a conductor 13 with the outer end of each arm 7. The clamping stress is applied to each pair of jaws by a screw 14 threaded in the rear end of the jaw 4 and bearing against the corresponding end of the jaw 8. The jaws 4 and 8 are not permitted to directly engage the carbons 15 but are gripped by bearing members 16 detachably mounted upon said jaws. As best seen in Fig. 2, said bearing members fit snugly into the V-shaped seats 17 oppositely formed in each pair of jaws, and a pair of lugs 18 outwardly projecting from the upper and lower ends of each bearing member are terminally connected by cotter pins 19. Thus it is evident that said bearing members while normally held rigid with the jaws 4 and 8 may be quickly removed from said jaws by merely withdrawing said cotter pins.

The use of the detachable bearing members 16 effects a considerable saving whenever the carbons become burned sufficiently short to fuse the holders, since the cost of replacing the fused bearing members is much less than would be that of replacing the entire jaws, as would be necessary if said bearing members were not used. Also a ready adjustment of the jaws to adapt them for gripping different sizes of carbons may be effected by properly selecting the aperture 10 through which the pivot pin 11 is passed.

What I claim is:

In a carbon holder, a pair of pivotally connected clamping jaws having V-shaped seats in their opposed faces, a pair of bearing members for gripping the carbons snugly engaging said seats, lugs extending outwardly from said bearing members above and below the corresponding jaws, and detachable connections between said lugs adjacent the outer faces of the jaws.

In testimony whereof I sign this specification.

ANTHONY S. HRUSKA.